May 18, 1965 L. J. LA BORE ETAL Re. 25,778
NON-SLIP STRUCTURES
Original Filed March 4, 1959
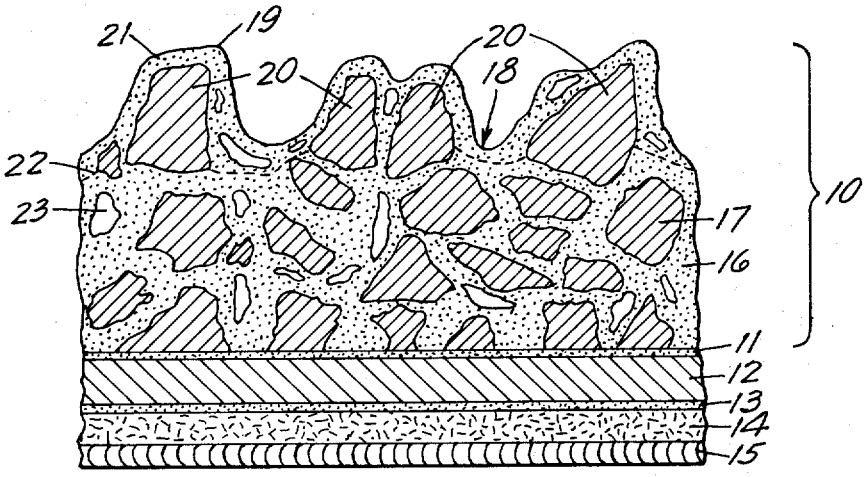
INVENTORS
LEONARD J. LA BORE
EUGENE J. DUPRE
BY
Carpenter, Abbott, Coulter & Kinney
ATTORNEYS United States Patent Office Re. 25,778
Reissued May 18, 1965

25,778
NON-SLIP STRUCTURES

Leonard J. La Bore, St. Paul, and Eugene J. Dupre, St. Paul Park, Minn., assignors to Minnesota Mining and Manufacturing Company, St. Paul, Minn., a corporation of Delaware Original No. 3,030,251, dated Apr. 17, 1962, Ser. No. 797,200, Mar. 4, 1959. Application for reissue May 7, 1962, Ser. No. 193,371
10 Claims. (Cl. 161—116)

Matter enclosed in heavy brackets [ ] appears in the original patent but forms no part of this reissue specification; matter printed in italics indicates the additions made by reissue.

This application is a continuation-in-part of Serial No. 651,106, filed April 5, 1957, which latter is a continuation-in-part of Serial No. 638,527, filed February 6, 1957, both now abandoned.

This invention relates to non-slip sheet articles capable of providing increased resistance to slippage as they are deformed under foot pressure. Our non-slip articles have a wear-resistant protuberated surface layer which is characterized by being readily deformable under foot pressure and by remaining significantly anti-slip in character even when coated with a thin film of mobile material (e.g., water, soap solution, and even oil) at any stage during their useful wear life.

A particularly novel feature of the sheet articles of this invention is that with respect to their behavior when walked upon. This behavior causes a person walking across a floor covered with our sheet material to experience a comfort in walking that is similar to the comfort one experiences when walking over a tufted carpet. Such a result is particularly surprising in view of the fact that our protuberated surface layer is extremely thin as compared to tufted carpets. The noise of walking is deadened by our articles; and, even though they contain rubber, knee and leg fatigue associated with walking upon bouncy rubber floor coverings is not noticeable.

The protuberances of our protuberated layer are irregular smooth-surfaced projections with no sharp angular edges. The layer is non-abrasive, non-scratchy, and non-sparking even after prolonged wear. It does not scratch or mar objects in contact therewith. Its combination of properties makes its particularly useful as an anti-slip surface for use in shower stalls, bathtubs, swimming pools, diving boards, etc., where it provides sought-after comfort as well as required anti-slip traction under various conditions to which it is subjected in such uses. These illustrative uses are fraught with problems to which no one prior to our invention, insofar as we are aware, has provided a practical and acceptable solution.

Our sheet article is weather-resistant and relatively easily cleaned so as to be sanitary for uses both indoors and outside. It is non-absorptive and does not swell on exposure to water. Its luxurious appearance and comfort-features make it ideally suited as a non-slip floor covering or "carpet" in lobbies and entrances of public buildings.

As compared to prior art abrasive-like anti-slip materials, our article advantageously saves on shoe leather. It exhibits traction and anti-slip properties against a wide variety of surfaces (e.g., shoe leather, and even smooth steel, glass, etc.). It does not contain hard [abrasiv-like] *abrasive-like* particles which might break loose and cause damage to machinery; thus, it is well suited for use in applications around machinery, providing anti-slip traction even when covered with thin films of oil. Sparking resulting when metal instruments strike a hard anti-slip surface sometimes presents a safety hazard—a problem which is obviated when our article is used.

The irregular surface of our article renders it valuable for use in non-glare applications as in the fabrication of sets for motion pictures where high reflectance of light constitutes a serious problem of photography. Acoustically, the protuberated surface of our article may be used to contribute to a reduction in noise level. Its energy absorbing qualities are especially useful in damping the transmission of sound from solids to air or other fluids. For example, used on resonating metal walls, it reduces annoying sounds.

In general, since our article can be fabricated in a wide variety of colors, or painted with suitable paints of any desired color, its inherent properties make it useful as a decoative attractive surfacing material of desired properties for walls, ceilings, floors, tabletops, boards, paddles, etc. Many other uses for our article (e.g., as a cushion pad underneath conventional floor coverings, a covering for pulleys, etc.) will readily suggest themselves in view of the combination of properties and characteristics possessed by it.

The invention will further be described in connection with a drawing, made a part hereof, in which a magnified schematic cross sectional view of a preferred embodiment of our sheet article is illustrated.

As illustrated in the drawing, our non-slip sheet article has, as an essential part thereof, a highly protuberated and deformable surface layer 10. This layer is formed by coating procedures and possesses certain inherent highly advantageous properties as a result of its method of formation and the dissimilar nature of its phases. Its character is of essential significance in understanding the instant invention. It contains an essentially continuous phase (16 and 21 in the drawings) within which a multitude of discrete compressible resilient non-adhesive particles (17 and 20 in the drawing) are embedded and randomly distributed as a discontinuous phase. The continuous phase is highly resistant to wear, being relatively more wear-resistant than the particles 17 and 20. For example, in a wear test where a circular disc of abrasive sheet material is forced against a film of the material to be tested under constant pressure and the abrasive disc rotated in a planetary fashion, it has been found, under equal test conditions, that films of our continuous phase as illustrated herein have exhibited from 5 to 50 or more times the wear-resistance of scrap tire-rubber, and extraordinarily greater water-resistance than cork. Scrap tire-rubber and cork are both useful in particle form as the discontinuous phase of our protuberated layer. Generally, we believe that the continuous phase should exhibit at least about twice the wear-resistance (i.e., less than about half the weight loss) of the composition of the particles, and preferably at least 5 times more wear-resistance. Thus, our protuberated surface layer wears unevenly during its life in practical use applications and continually presents an irregular or uneven surface of projecting matter.

This deformable protuberated layer 10 may be marketed alone as a non-slip covering material. It may be affixed to substrates by using "bucket-type" adhesives (e.g., adhesive solutions) and the like. It is much preferred, however, to market a product with a flexible dimensionally-stable sheet backing 12 affixed to the protuberated layer, as illustrated in the drawing. Backings permanently united to the protuberated layer improve its wear-durability in many applications where it is subjected to heavy scuffing action. Where adhesion between a selected backing 12 and layer 10 is relatively weak, a prime treatment or activation or coating 11 may be advantageously used, as known in the art; and priming is preferably employed in cases where an organic film backing such as polyethylene terephthalate ("Mylar") is employed.

An adhesive coating 14 on the flat back side of our article is preferably employed as a part of the composite article furnished to the user, and permits convenient attachment of the article to a floor or other surface as desired. For improved anchorage, a prime treatment or coating 13 may be employed between adhesive layer 14 and backing 12. Also, a temporary removable low-adhesion liner 15 is desirably placed next to adhesive layer 14 so as to protect it from contamination during shipment and storage.

To gain the results here discussed for protuberated layer 10, we have found that it is essential to employ resilient non-adhesive particles 17 and 20 small enough to pass through a screen of about 10 mesh. At least 90% of the volume of the particles should be in the range of about 10 to 100 mesh; and particles in the range of 20 to 100 mesh are preferred.

These particles are non-adhesive in a character in that they are not tacky but are free-flowing in bulk form at room temperature. They are also resilient or "live" in character, i.e., they are readily compressible and tend to recover their original shape quite readily after the withdrawal of compression or deformation forces. For example, within a minute following the withdrawal of a compressive force of 10 p.s.i., they regain at least about 90% of the thickness lost in compression.

Suitable compressible resilient non-adhesive particles 17 and 20 may be formed by grinding vulcanized reclaim rubber into particles of the size required. Suitable particles may also be formed using new rubber materials or compositions which, like reclaim rubbers, have "live" rubber characteristics. Compressible resilient particles of cork (e.g., natural cork from cork oak in the Mediterranean area) may be used in the required size distribution. Even sponge rubber particles may be employed to fabricate articles of satisfactory properties for certain uses. Preferably particles of irregular non-repetitive surface patterns such as those resulting from grinding are employed. It will be appreciated that as used herein, rubber refers to compounds of natural rubber, as well as to synthetic elastomers or polymers having rubbery properties, or mixtures of such materials.

While the size range distribution of the particles in the protuberated layer may be essentially the same throughout the layer, it is preferable to employ particles of a size range distribution between about 30 and 100 mesh for those particles 17 in the underlying portions of the continuous phase matrix 16 beneath the level of the valleys 18 of the protuberances. In effect, the body of the matrix beneath the protuberances may be characterized as the "underlying portion." In the usual case, rubber ground so as to just pass a 30 or 40 mesh screen contains a large proportion of particles near the upper size limit, which is desired. Particles smaller than about 80 mesh contribute little to the properties of the product (and any particles smaller than 100 mesh act substantially as fillers in the matrix). Where excessively large particles 17 are employed in the underlying portions, problems arise with respect to coating a slurry of matrix material with the admixed insoluble particles, which is a preferred step in fabricating the product. They tend to act as dams causing excessive discontinuity in the coating. Also, while superior results (especially, durability under heavy loads) are more readily attainable where "live" rubber particles are employed in the underlying matrix, some measure of preference for them over cork also arises because cork particles in a coating slurry tend to float toward the top of an applied slurry coating, which may disrupt the desired essentially uniform but random distribution of particles 10 throughout the thickness of a slurry coated underlying matrix.

Protuberances 19 on the exposed surface of layer 10 are formed by drop-coating block granular resilient non-adhesive particles 20 such as aforedescribed upon the underlying matrix, and then applying a coversize of long-wearing, readily-deformable matrix material 21 thereover. The coversize of matrix 21 is essentially continuous with the underlying matrix portion 16 of the protuberated layer, and is preferably relatively thin over the particles as compared to the total thickness of the protuberated layer or the underlying portion thereof. This coversize coating on particles 20 leaves an exposed surface of irregular, smooth-surfaced or rounded projections without any sharp points or edges. For convenience in understanding the fact that the coversize of matrix is applied as a separate coating, a broken line 22 is placed in the drawing and extends irregularly across the illustrated protuberated layer of the drawing.

Particles 20 employed to form the protuberances or projections of the layer should be too large to pass a screen of about 60 mesh since smaller particles tend to become flooded too easily. A practical size range giving a good balance of the required properties for our protuberated layer is about 10 to 40 mesh, particles of about 20 to 40 mesh being preferred. These particles may consist of the same material as those employed in other portions of the protuberated layer. Contrary to what might be expected from the prior art (e.g., see U.S. Patent No. 2,706,936 to Willson), protuberances formed using cork particles are not easily loosened or rubber from the surface of our article; and they do not swell or change the volume of the structure upon continued exposure to water.

The continuous phase of flexible matrix 16 in our structure is formed of a rubber-based or rubbery adhesive composition which is cured in situ to a tough, non-brittle, wear-resistant state. At least one third of the total weight of the solids material of the coninuous phase, exclusive of inorganic fillers, is rubber material. The visco-elastic properties of this underlying matrix are such that it accepts substantial deformation under ordinary foot pressure, and lends to recover from deformation after withdrawal of such pressure. A variety of curable rubber-based adhesive compositions may be used in fabricating a product of the type here described; thus, while the illustrative examples to follow set forth currently preferred oil- and flame-resistant polychloroprene rubber formulations, it will also be understood that various other synthetic (e.g., butadiene-acrylonitrile copolymers, butadiene-styrene copolymers, polyester-bisamide rubbers, polyurethane rubbers, etc.) and natural rubbers or blends may be employed for our matrix. For example, a liquid rubber composition consisting of about 105 parts of a carboxyl-terminated polyester of diethylene glycol adipate branched with trimethylol propane, about 17 parts of N,N'-bisethylenisosebacamide as a curing agent, 3 parts of activated silica, and about 70 parts of titanium dioxide, may be heat-cured to provide a rubbery matrix of satisfactory properties as aforedelineated for our product. Indeed, new and improved rubbers are constantly being developed and made available to the public for use as a replacement for natural rubber or present-day widely-used synthetic rubbers; thus, persons of ordinary skill in the art to which this invention appertains may readily employ such rubbers with only routine experimentation using the guiding principles of this disclosure to manufacture articles as here described.

The adhesive nature of the underlying matrix material is such that it is tacky prior to being cured and after any solvents have been evaporated. Adhesive anchorage of the surfaces of the embedded particles within the underlying matrix is gained at this stage, and the anchorage is strengthened and the material of the matrix made wear-resistant, solvent-resistant and non-tacky by the subsequent curing step. Organic tackifying resins are frequently useful to impart tack to a rubber matrix composition, but other expedients known to the art may instead be used for this purpose. With mill bases of rubber composition may be blended oil-soluble, heat-advancing phenol-formaldehyde resins in amounts up to about equal the weight of the rubber to form adhesive compositions which advantageously exhibit improved toughness and hardness after curing. Curing agent complexes such as illustrated in our specific examples are especially useful where polychloroprene rubber is used as the base for the adhesive matrix; but where other rubbers are used, appropriate curing systems must be chosen, as is well understood. Thus, even oxirane oxygen groups may be useful to achieve a curing action for carboxylated rubbers. Plasticizers, finely divided fillers, pigments, etc., may be incorporated in various amounts in the matrix composition to gain modified properties so long as the required properties for the underlying matrix are maintained.

Generally the coversize over the outermost particles 20 will be analogous in properties to the underlying matrix itself, even the same composition being employed. However, flexible deformable tough wear-resistant solvent-resistant tack-free in-situ-cured (e.g., polymerized or set-up) coversize coatings of modified composition are sometimes advantageous for color effect, added scuff resistance, etc.

Matrix portions 16 and 21 prepared in the manner described are frequently noted to contain some strain lines and also small pockets or voids 23 randomly distributed therein, which may contribute to the properties exhibited by the composition of some protuberated layers. Small voids seem to arise by virtue of the preferred method of making the layer, and may substantially be reduced, if desired, by employing de-aired coating compositions and vacuum forming techniques. But such expedients are rather impractical on a large scale operation, and some voids do not amount to an objectional characteristic of the product.

For the proper cushion effect to be exhibited by our non-molded protuberated surface layer, the volume of particles 17 and 20 in relation to the volume of the materials of the continuous phase or integral matrix 16 and 21 (i.e., total binder solids) should be maintained within certain extremes. The total volume of the particles in the layer should not exceed about three times the total volume of the entire binder matrix. If the volume ratio of particles to matrix exceeds about 3:1, wear characteristics of the product fall off. Below a ratio of about 0.2:1 the product still exhibits good wear life but exhibits decreased slip-resistance when wet and loses its carpet-like behavior within a short period after installation on a traffic-carrying floor. Preferably the volume ratio of particles 17 and 20 to matrix is between approximately 2:1 and 0.5:1. A ratio of the volume of particles 20 (which cooperate with the coversize to provide the protuberances) to the volume of particles 17 in the underlying matrix would be misleading inasmuch as the thickness of the matrix below the protuberated portion may vary, and indeed both particles 17 and 20 may be identical.

The total over-all thickness of surface layer 20 may be as low as approximately 20 mils or as high as approximately ⅛ of an inch, or slightly higher, although products having a protuberated surface layer within the range of approximately 20 to 100 mils are preferred, particularly for floor installation. The more flush the sheet article lies on a floor, the less tendency for it to be kicked or scuffed along edges next to floor areas not covered.

Since the total thickness characteristic of protuberated surface layer 10 is a difficult factor for precise measurement because of the protuberances, it may be useful to describe the thickness of this layer by reference to the solids volume of the particles and matrix in the layer per one square inch of its surface. According to such a standard, our surface layer 10 has a calculated volume of material of approximately 0.01 to 0.1 cubic inch per square inch of surface, preferably 0.015 to 0.075 cubic inch per square inch of surface. It will readily be appreciated that the attainment of carpet-like behavior properties is particularly unusual in view of such an extremely thin protuberated surface layer.

Dyes and pigments are useful in fabricating our structure so as to achieve varied decorative color (chromatic or achromatic) effects as desired. For example, pigments such as titanium dioxide, carbon black, iron oxide, copper phthalocyanine, etc., may be used to color the particles or the composition of the matrix. Cork particles may be stained using dyes such as, for example, 1,4,5,8-tetra-amino-anthraquinone blue, alizarine cyanine green, etc. Mixtures of various pigments and dyes may be employed, and articles may be formed with particles 17 or 20 of different color from the matrix.

Sizing coats of rubber base or latex paints, colored as desired, may also be applied over protuberances of the structure. Even thin films of conventional oil base paints, enamels, varnishes, etc., may be applied over protuberances to gain various decorative effects. Thin films of polyethylene, polyurethanes, polyvinyl chloride, fluorocarbons, polyamides such as nylon, or other similar tough film-forming materials may be painted, as by spraying, over the surface of our structure following the irregularities of the protuberances thereof; and advantageously, they improve the scuff resistance and useful life of the structure without materially reducing the anti-slip properties of the surfaces or deleteriously affecting the carpet-like properties of the composite.

As the base member or sheet backing 12 for our articles, we may employ various fabrics, laminates, or treated sheet backings (for example, those described in Kugler and Oakes, U.S. Patent No. 2,357,335); but flexible tough films of organic materials, such as, for example, polyethylene terephthalate ("Mylar"), etc., are preferred. One advantage in using a polyethylene terephthalate film lies in its high resistance to moisture penetration, rendering articles with such backings dimensionally-stable and resistant to damage by water. Thin organic backing films (e.g., polypropylene, nylon, polyvinyl chloride, low pressure polyethylene, polystyrene, "Mylar," etc.) permit extremely thin composite articles to be formed without loss of carpet-like properties, durability and anti-slip properties. Advantageously such structures lie flush on a floor or the like so as to be less easily torn or kicked free under ordinary conditions of use.

On the back side of the backing 12 (either directly or with an intermediate primer 13), we usually apply a thin layer of a high strength water-insoluble normally tacky pressure-sensitive adhesive. Such adhesives are well known in the art as "rubber-resin type" pressure-sensitive adhesives; and in the application here discussed, they facilitate attachment of the non-slip structure to an underlying surface. If desired, solvent or heat-activated, or even water-remoistenable, adhesives may be used instead of a pressure-sensitive one. Adhesive layer 14 may be provided with a low adhesion removable liner 15, e.g., Holland cloth, polyethylene film, etc., to protect it from becoming contaminated before it is applied to an underlying surface in use. The end sheet article may be wound upon itself into a roll for marketing.

The essential features and relationships among the materials and layers in our articles will be further illustrated and described in connection with the following illustrative but non-limitative examples.

EXAMPLE 1

A flexible water-resistant sheet backing was prepared by impregnating cotton drills cloth with a solvent dispersed thermoplastic resinous polymer, e.g., a modified vinyl acetate polymer such as described in Oakes U.S. Patent 2,357,350, by saturating the drills cloth on squeeze rolls and heating the structure to evaporate the solvent. Thereafter, a very thin film of phenol-formaldehyde resin solution (as described in the aforementioned patent to Oakes) was coated on both surfaces of the impregnated backing at a coating weight of about 1/10 pound of solids per square yard, after which the solvent was evaporated and a partial cure of the resin effected by heating the sheet to 185° F. for about 1½ hours. Subsequent heating steps in the fabrication of the structure caused substantially complete curing of this film.

A mill base for the matrix composition was prepared by milling 50 parts by weight of polychloroprene rubber ("Neoprene Type W"), and one part of an antioxidant (e.g., phenyl beta naphthylamine ("Neozone D")) on a rubber mill until the rubber was plastic and easily workable, which required about 15 minutes of milling during which time the temperature of the neoprene rose to about 200° F. 50 parts of "Dixie Clay," a low colloidal kaolin clay, were next milled into the rubber as a filler. Next 10 parts of a red pigment, e.g., the calcium salt of the product formed by coupling diazotized o-chlor p-toluidine m-sulfonic acid with beta-hydroxy-naphthoic acid ("Watchung Red RT–428–D"), were blended in. Curing agents for the neoprene were next blended with the mass, and for this 2 parts of magnesium oxide ("Maglite M") and 2.5 parts of zinc oxide were used. Lastly, about 0.5 part of a curing accelerator, i.e., 2-mercaptoimidazoline, was added and milled into the mass.

The above mill base was then mixed with toluene in a heavy duty internal mixer. With this solution in the mixer were then blended 13.4 parts of a phenol-formaldehyde curing aid. For this, an oil-soluble heat-advancing p-butyl phenol-formaldehyde resin having a softening point, as determined by the ball and ring method, of 190–220° F. was used. The resin is heat advancing in that, on heating, it first becomes soft and then, after continued heating, becomes a hard insoluble mass. Sufficient toluene was added to the mixture to lower the viscosity to about 900 centipoises, the solids content of the solution then being about 30% by weight.

The foregoing rubber-based adhesive solution was applied by roll coating at a weight of 62 grains per 24 sq. in, on one side of the previously impregnated fabric backing afore-described. Then previously stained cork particles were dropped from a gravity hopper into the film coated binder matrix solution. The cork particles were of a size ranging from about 20 to 40 mesh and had been stained a red color by soaking for about 15 minutes in a solution of ethyl alcohol and 1-amino-4-hydroxy-anthraquinone dye, followed by drying. Approximately 18 grains of cork particles per 24 sq. in. of backing were applied, and then the binder coating dried of solvent by exposure to 100–110° F. for 20 minutes.

Next a further coating of binder solution in the amount of 110 grains per 24 sq. in. was applied, additional stained cork in the amount of 26 grains per 24 sq. in. dropped into this coating, and the solvent again removed under the same conditions as aforenoted, i.e., heating to 100–110° F. for 20 minutes.

Over the resulting structure was then applied a further coating of the aforedescribed binder solution in the amount of 140 grains per 24 sq. in. and the solvent removed by heating to 100–110° F. for 30 minutes, after which a final coating of the binder solution, also in the amount of 140 grains per 24 sq. in. was applied and the resulting structure again dried at about 110° F. for about 30 minutes.

Then the structure was gradually heated over a period of 30 minutes to a curing temperature of 230–250° F., which was maintained for about 30 minutes, followed by gradual (about 30 minutes time) cooling to room temperature. This curing step served to toughen the binder matrix and improve its solvent resistance. The binder matrix resulting was non-tacky, tough, highly flexible, and readily deformable. It was not as resilient as "live" rubber or cork particles. Samples of the cured continuous matrix material tested alone showed a tendency to absorb some work put into them in compression, and recovered only slowly after withdrawal of compression. For example, they recovered only up to about 80% of their original shape within two minutes after removing 10 p.s.i. compression held for one minute. Such a compression is in the range (e.g., 7 to 14 p.s.i.) ordinarily applied when a person walks over a floor In a comparison between our protuberated surface layer and a layer having a superficial resemblance to our layer, but having sharp angled projections molded from homogeneous rubber composition, it was noted that our layer was less resilient than the molded rubber layer. Although both would be characterized as readily deformable, our layer was slightly slower in its acceptance of deformation, and slower in its tendency to recover its original thickness after withdrawal of the compressive forces. In addition, our layer maintained its protuberated character throughout its wear life in practical use application, whereas the molded rubber layer wore smooth.

On the side of the backing fabric not coated with aggregate as aforedescribed, a thin layer of a high strength, water-insoluble, normally tacky and pressure-sensitive adhesive was applied from solvent solution, the solvent evaporated, and a Holland cloth low adhesion removable liner placed upon the adhesive coating to protect it from contamination during shipment and storage.

The volume ratio of resilient particles to the total matrix binder in the protuberated surface layer of this structure was about 2:1. The total calculated solids volume per square inch of surface for this layer was about 0.020 cubic inch.

In a standard Navy wear test involving rotating a wear wheel against a test structure, it was noted that the structure of this example stood up at least about two times longer than a popular prior art abrasive grain anti-slip structure. The abrasive anti-slip structure and our structure were initially of equal thickness in conducting this test, but the abrasive grain structure wore down to its fabric much more rapidly. Also, comparison of wearability of the structure hereof with standard commercial vinyl and rubber floor tiles showed that our structure had at least about twice the wear resistance of such materials, a particularly surprising result in view of the protuberated nature of our wear or contact surface.

EXAMPLE 2

This example illustrates a structure of the invention formed without use of a special backing or support member such as 12 in the drawing.

A 42% by solids weight natural rubber-resin adhesive solution was prepared according to Example 1 of U.S. Patent No. 2,410,053, issued to Richard G. Drew. This adhesive solution was applied on the surface of a polyethylene coated kraft paper in the amount of about 75 grains of adhesive solution per 24 sq. in. The polyethylene coated paper functions as a temporary backing for coating purposes as well as a removable liner for the resulting structure. The top exposed surface of the coated adhesive was then detackified by lightly dusting it with fine cork powder. Any excess of cork powder not needed for detackifying the adhesive surface was blown off by an air fan. Conveniently, any suitable fine powder material may be used to accomplish the detackification of the exposed pressure-sensitive adhesive surface, or such detackification may be omitted.

A 33% by solids weight polychloroprene-phenolic resin adhesive solution was separately prepared in the following manner: A polychloroprene base was prepared by milling together 100 parts of polychloroprene rubber ("Neoprene Type G"), 1.5 parts of granular sodium acetate, 4 parts of magnesium oxide, 5 parts of zinc oxide, and 2 parts of phenyl alpha naphthylamine antioxidant. The polychloroprene base was transferred to a ribbon blender and blended with 83.2 parts of oil-soluble heat-advancing p-tertiary-butyl phenol-aldehyde resin, 27.9 parts of a tackifying paracoumarone-indene resin having a melting range of about 150 to 160° C. as determined by the Barrett method, 11.1 parts of ethyl alcohol and 440 parts of toluene.

A coating slurry was then prepared by mixing 100 parts by weight of the polychloroprene-phenolic resin adhesive above and 5 parts by weight of 30–40 mesh cork particles. Knife coating was used to apply 170 grains of this slurry per 24 sq. in. over the detackified surface of the pressure-sensitive layer. While the coated slurry was still wet, 30–40 mesh cork particles were drop coated on its surface in the amount of 10 grains per 24 sq. in. The coated material was allowed to air dry for 30 minutes. A surfacing protective layer or coversize of the polychloroprene-phenolic resin adhesive previously described, diluted with toluene to 25% solids, was then applied over the cork particles, using 100 grains of the diluted adhesive solution per 24 sq. in. of surface area. This protective layer was allowed to air dry for 20 minutes, after which time the entire structure was cured in a forced air oven for one hour at 150° F. The resulting sheet structure could then be wound into rolls and packaged for shipping. Its protuberated layer had a volume ratio of particles to binder of about 1.5:1, and a square inch of its surface had a calculated volume of about 0.015 cubic inch.

EXAMPLE 3

This example illustrates the preparation of our sheet article with a polyethylene terephthalate backing film.

A priming solution was applied to one side of a two mil thick film of biaxially oriented polyethylene terephthalate at a coating weight of approximately 8 grains per 24 square inches, after which solvent was removed and the prime coat pre-cured by heating to a temperature of 310° F. for about 4 minutes. The priming solution consisted of a mixture of 6 parts by weight of an ethyl acetate solution (75% solids) of the low-volatility polyfunctional reaction product of a mixture of tolylene di-isocyanate and trimethylol-propane having a NCO:OH ratio of 2:1 ("Mondur CB" of Mobay Chemical Co.), 10 parts by weight of a flexible crepe-like cream-colored isocyanate-reactive polyester resin (e.g., "Multranil BY–176" of Mobay Chemical Co., believed to be formed by reacting a di-isocyanate, e.g., naphthalene 1,5-di-isocyanate, with an excess of polyester resins, e.g., polyethylene adipate), 14 parts of finely divided calcium carbonate, 16 parts of toluol, and 60 parts Cellosolve Acetate.

To the uncoated side of the backing film was applied 8 grains per 24 square inches of a second priming solution consisting of a mixture of 10 parts of the above-described polyfunctional di-isocyanate reaction product with 15 parts of the above-described polyester resin and dissolved in 85 parts of Cellosolve Acetate. Then 15 grains per 24 sq. in. of ground white scrap-rubber particles of a size small enough to pass a 38 mesh screen (approximately 90% of the volume of the particles being in the range of 38–100 mesh) were immediately dropped in the second prime coating, after which solvent was evaporated and the particle-coated layer pre-cured for 30 minutes at 200° F.

A mill base for the matrix was prepared in the same manner as that described in Example 1, except that the "Dixie Clay" and the red pigment were omitted, and 20 parts of finely divided titanium dioxide were added. To this mill base was then added 5 parts of ethyl alcohol, 150 parts of toluol, and 10 parts of an oil-soluble heat-advancing p-tertiary-butyl phenol-formaldehyde resin ("Super-Beckacite 1001").

To 100 parts of the adhesive solution just described was added 11 parts by weight of ground white scrap-rubber particles of the size referred to previously in this example, and the mixture stirred thoroughly to produce a slurry. A coating weight of approximately 210 grains per 24 sq. in. of this slurry was then knifed over the rubber particle-coated surface of the film backing. Over this last coating were dropped 26–38 mesh white scrap-rubber particles at a concentration of 75 grains per 24 sq. in. The coated sheet material was hung in festoons and pre-cured for approximately 30 minutes at 220° F.

Next a white coversize adhesive dispersion was applied over the exposed rubber particles in a quantity sufficient to give about 35 grains of dry solids coversize per 24 sq. in. The coversize adhesive dispersion was prepared as follows: To 220 parts by weight of a 9–9.5 pH aqueous emulsion (47% solids) of polymers consisting of 2 parts methyl methacrylate, 1 part ethyl acrylate and a small amount of acrylic acid ("Rhoplex AC–33" of The Resinous Products Division of Rohm and Haas Co.) was added 52.8 parts of a separately-prepared water dispersion of titanium dioxide containing 26.4 parts solids. Next 34 parts of a freshly-prepared water dispersion (about 80% solids) of melamine-formaldehyde resin were added. The melamine-formaldehyde dispersion contained about 7% urea as a buffer or formaldehyde-acceptor, and about 4% of an acid-releasing salt (a hydroxy-alkylamine hydrochloride) as a curing promoter. Then 22 parts of a water solution of 4% carboxymethyl cellulose were added and the mixture stirred to gain a uniform dispersion.

The coversize coated article was then gradually heated to 250° F. over a 90 minute period, and then cured at 250° F. for about 60 minutes.

The resulting layer had a volume ratio of particles to binder solids of about 1.1:1. The protuberated layer had a calipered thickness of about 60 mils and a calculated solids volume of about 0.022 cubic inch per square inch of surface.

The backing opposite the non-slip structure was coated with the pressure-sensitive adhesive described in Example 2, the latter being provided with a low adhesion removable layer of embossed polyethylene film.

It is to be noted that the highly protuberated surface of our articles is not formed by a molding step. The attainment of dissimilar wear properties between a continuous phase and a discontinuous phase, as required for our article, would be impossible where a homogeneous [comosition] *composition* is molded to provide projections over a surface.

When an individual steps upon our improved non-slip surface, the first condition ensuing is that the protuberances contact the bottom of the foot giving a limited contact a high unit pressure. This initial contact initiates the pronounced protective non-slip action of our surfaces. As full weight is placed upon the foot, it sinks into our surface material slightly and may be said to be somewhat mechanically lodged therein. Additionally, the pressure depresses the protuberances of our surface and increases the area of frictional contact between the foot and our surface. The net result of this increase in pressure and increase in area of contact is that *of* a very substantial increased resistance to slippage. The ready compressibility of the surface layer facilitates maintenance of this high surface area of contact while weight is applied; however, we believe that complete flattening of the protuberated surface of our layer under the usual foot pressures of an individual walking over the layer does not take place, but rather that some degree of irregularity of the surface is maintained even under foot pressures. Whatever the explanation might be, our article exhibits surprisingly high anti-slip traction under a wide variety of conditions of use. Another feature is that when an individual reduces the weight on his foot in contact with our surface, as by shifting his weight from one foot to the other, substantial resistance to slippage still is maintained. On the other hand, in the case of abrasive-type anti-slip surfaces, a substantial loss in the resistance to slippage occurs when the individual reduces the weight of his foot in contact with the abrasive grain. Thus, our surfaces are especially useful on boats and vehicles of all kinds where shifts in weight and forces causing slippage are not always predictable.

In addition, the dissimilar wear properties of the phases of our protuberated layer contribute to the maintenance of its anti-slip character even when coated with thin films of mobile materials at various stages of wear. Placing a foot on our protuberated layer causes such film coatings to be significantly squeezed out from areas of foot-to-protuberated-layer contact, and thus anti-slip traction is gained as required, which is quite different from the treacherous result experienced when one places a foot on a slippery film-coated smooth rubber mat.

This specification is to be construed in its broadest aspect and as an illustration of the essential features of our invention, which is further defined and set forth in the claims appended hereto.

That which is claimed is:

1. A unitary water-resistant sheet article, [having a] *the back surface of which is free of a backing support member, and flat so as to be suitable for continuous adhesive anchorage to a flat substrate, said article consisting essentially of a* flexible long-wearing non-molded non-abrasive anti-slip irregularly-protuberated exposed surface layer which wears unevenly and maintains an anti-slip character even after prolonged wear and even when coated with a thin mobile film after prolonged wear, said layer being further characterized by being deformable under foot pressure and providing increased resistance to slippage as it is deformed under foot pressure, as well as by providing carpet-like comfort when walked upon, said irregularly-protuberated layer comprising an essentially-continuous, flexible, readily-deformable, *tough, non-tacky* in-situ-cured, rubbery adhesive underlying matrix within which a multitude of discrete flexible resilient non-adhesive particles of a size range between approximately 10 and 100 mesh are randomly distributed and bonded, the protuberances of said irregularly-protuberated layer being non-molded smooth-surfaced projections consisting of particles of the aforesaid type in the size range of 10–60 mesh bonded to said underlying matrix and coated on their projecting surfaces with a flexible, readily-deformable, tough, *non-tacky* in-situ-cured, adhesive coversize of matrix integral with said underlying matrix, the integral matrix of said irregularly-protuberated layer being at least about two times more wear-resistant than the discrete particles therein, whereby said layer exhibits uneven wear characteristics, [and] the volume ratio of said discrete particles to the solids material of said integral matrix being between 3:1 and 0.2:1, *the total over-all thickness of said irregularly-protuberated layer being not in excess of 100 mils and the calculated volume of material in said irregularly-protuberated layer being not in excess of 0.075 cubic inch per square inch of the surface of said layer.*

2. The article of claim 1 having an adhesive coating on the surface thereof opposite said protuberated surface.

3. As a new article of manufacture: the article of claim 2 having a temporary removable protective low-adhesive liner over said adhesive coating.

4. A unitary water-resistant sheet article having *a flexible tough organic film backing to which is firmly bonded* a flexible long-wearing non-molded non-abrasive anti-slip irregularly-protuberated exposed surface layer which wears unevenly and maintains an anti-slip character even after prolonged wear and even when coated with a thin mobile film after prolonged wear, said layer being further characterized by being deformable under foot pressure and providing increased resistance to slippage as it is deformed under foot pressure, as well as by providing carpet-like comfort when walked upon, said irregularly-protuberated layer comprising an essentially-continuous, flexible, readily-deformable, *tough, non-tacky,* in-situ-cured, rubbery adhesive underlying matrix within which a multitude of discrete flexible resilient non-adhesive rubber particles of a size range between approximately 10 and 100 mesh are randomly distributed and bonded, the protuberances of said irregularly-protuberated layer being non-molded smooth-surfaced projections consisting of discrete flexible resilient non-adhesive particles in the size range of 10–60 mesh bonded to said underlying matrix and coated on their projecting surfaces with a flexible, readily-deformable, tough, *non-tacky* in-situ-cured adhesive coverage of matrix integral with said underlying matrix, the integral matrix of said irregularly-protuberated layer being at least about two times more wear-resistant than the discrete particles therein, whereby said layer exhibits uneven wear characteristics, [and] the volume ratio of said discrete particles to the solids material of said integral matrix being between 3:1 and 0.2:1, *the total over-all thickness of said irregularly-protuberated layer being not in excess of 100 mils and the calculated volume of material in said irregularly-protuberated layer being not in excess of 0.075 cubic inch per square inch of the surface of said layer.*

5. The article of claim 4 wherein the discrete particles in the protuberances are [rubbber] *rubber.*

6. The article of claim 4 wherein the discrete particles in the protuberances are cork.

7. A unitary water-resistant sheet article having a flexible dimensionally-stable [sheet] *thin tough organic film* backing to which is firmly bonded a flexible long-wearing non-molded non-abrasive anti-slip irregularly-protuberated exposed surface layer which wears unevenly and maintains an anti-slip character even after prolonged wear and even when coated with a thin mobile film after prolonged wear, said layer being further characterized by being deformable under foot pressure and providing increased resistance to slippage as it is deformed under foot pressure, as well as by providing carpet-like comfort when walked upon, said irregularly-protuberated layer comprising an essentially-continuous, flexible, readily-deformable, *tough, non-tacky* in-situ-cured, rubbery adhesive underlying matrix within which a multitude of discrete flexible resilient non-adhesive particles of a size range between approximately 10 and 100 mesh are randomly distributed and bonded, the protuberances of said irregularly-protuberated layer being non-molded smooth-surfaced projections consisting of particles of the aforesaid type in the size range of 10–60 mesh bonded to said underlying matrix and coated on their projecting surfaces with a flexible, readily-deformable, tough, *non-tacky* in-situ-cured adhesive coversize of matrix integral with said underlying matrix, the integral matrix of said irregularly-protuberated layer being at least about two times more wear-resistant than the discrete particles therein, whereby said layer exhibits uneven wear characteristics, [and] the volume ratio of said discrete particles to the solids material of said integral matrix being between 3:1 and 0.2:1, *the total over-all thickness of said irregularly-protuberated layer being not in excess of 100 mils and the calculated volume of material in said irregularly-protuberated layer being not in excess of 0.075 cubic inch per square inch of the surface of said layer.*

8. The article of claim 7 having a coating of normally-tacky and pressure-sensitive adhesive upon the rear side of said backing and a temporary removable protective low-adhesion liner over said adhesive coating.

9. As a new article of manufacture: a roll of a sheet article satisfying the requirements of claim 8.

10. The article of claim 7 wherein the [sheet backing is a thin tough] organic film *backing is polyethylene terephthalate.*

[11. The article of claim 10 wherein the organic film is polyethylene terephthalate.]

[12. The method of making a unitary water-resistant sheet article having a flexible long-wearing non-molded non-abrasive anti-slip irregularly-protuberated exposed surface layer characterized by being deformable under foot pressure and providing increased resistance to slippage as it is deformed under foot pressure, said method comprising coating a slurry of curable rubbery adhesive composition and discrete flexible resilient non-adhesive particles of a size range between approximately 10 and 100 mesh upon a sheet backing, dropping discrete flexible resilient non-adhesive particles of a size range between approximately 10 and 60 mesh over said slurry coating, applying a coversize of curable adhesive composition as an essentially continuous film coating over said dropped particles, and curing the essentially continuous phase of adhesive composition in said layer to bond said discrete particles within said continuous phase, the volume ratio of said particles to the solids material of said continuous phase in said layer being between 3:1 and 0.2:1.]

[13. The method of making a unitary water-resistant sheet article having a flexible long-wearing non-molded non-abrasive anti-slip irregularly-protuberated exposed surface layer characterized by being deformable under foot pressure and providing increased resistance to slippage as it is deformed under foot pressure, said method comprising applying alternate coatings of material upon a sheet backing to form an underlying structure consisting essentially of a curable rubbery adhesive composition as a continuous phase within which a multitude of discrete flexible resilient non-adhesive particles of a size range between 10 and 100 mesh are randomly distributed as a discontinuous phase, said adhesive composition being applied in separate coatings from said discrete particles, then dropping discrete flexible resilient non-adhesive particles of a size range of approximately between 10 and 60 mesh over said underlying structure, applying a coversize of curable adhesive composition as an essentially continuous film coating over said dropped particles, the coversize and the continuous phase of said underlying structure serving as an integral matrix, and curing said integral matrix to bond said particles therein, the volume ratio of said discrete particles to the solids material of said integral matrix being between 3:1 and 0.2:1.]

References Cited by the Examiner

The following references, cited by the Examiner, are of record in the patented file of this patent or the original patent.

UNITED STATES PATENTS

| | | | |
|---|---|---|---|
| 647,112 | 4/00 | Pearson. | |
| 1,237,493 | 8/17 | Ellis. | |
| 1,591,018 | 7/26 | Cutler. | |
| 1,614,989 | 1/27 | Mulherin. | |
| 2,156,871 | 5/39 | Rittenhouse. | |
| 2,275,989 | 3/42 | Perry. | |
| 2,542,058 | 2/51 | Geesdesel | 51—185 |
| 2,560,420 | 7/51 | Dodge | 154—46 |
| 2,583,198 | 1/52 | Axton. | |
| 2,752,277 | 6/56 | Keen | 154—49 |
| 2,777,693 | 1/57 | Mitchell | 154—53.5 |
| 2,836,528 | 5/58 | Ford | 154—49 |

EARL M. BERGERT, *Primary Examiner.*

ALEXANDER WYMAN, JOSEPH REBOLD, *Examiners.*